Dec. 4, 1956 W. H. DU SHANE ET AL 2,772,652
TRANSMISSION AND CONTROL THEREFOR
Filed April 8, 1955 3 Sheets-Sheet 1

INVENTORS
W. H. DuSHANE
V. E. RUGEN

Dec. 4, 1956   W. H. DU SHANE ET AL   2,772,652
TRANSMISSION AND CONTROL THEREFOR
Filed April 8, 1955   3 Sheets-Sheet 2
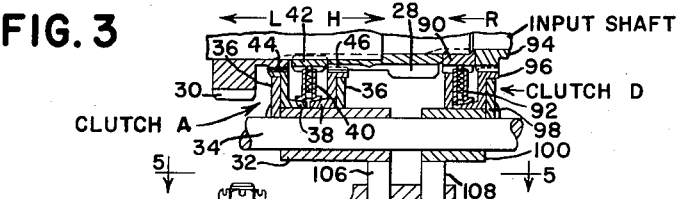
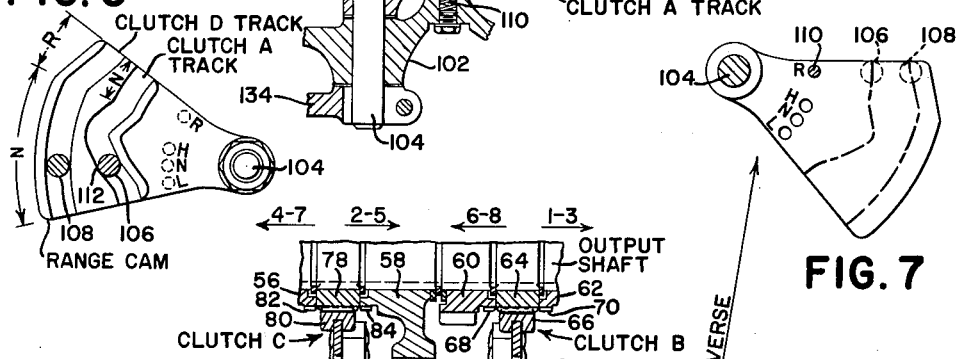
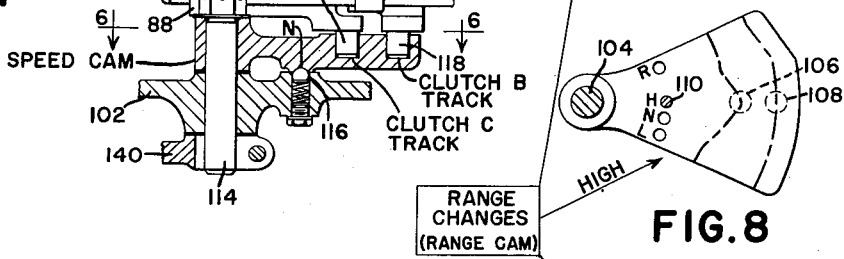
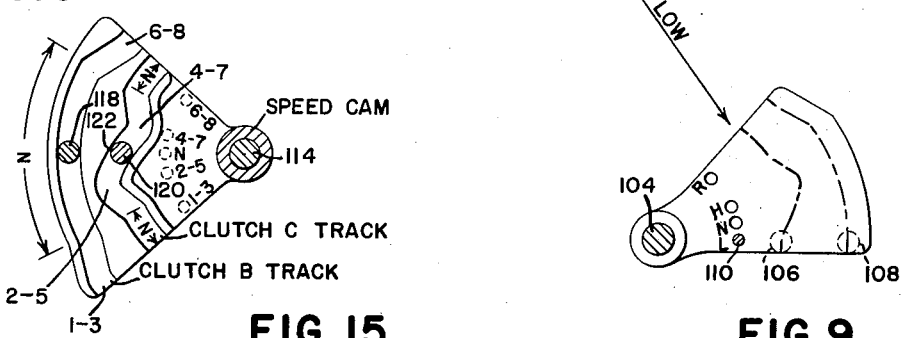
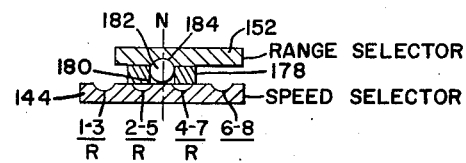
*INVENTORS*
W. H. DuSHANE
V. E. RUGEN

SPEED CHANGES (SPEED CAM)

INVENTORS
W. H. DuSHANE
V. E. RUGEN

United States Patent Office 2,772,652
Patented Dec. 4, 1956

2,772,652

TRANSMISSION AND CONTROL THEREFOR

Wallace H. Du Shane, Waterloo, and Vernon L. Rugen, Cedar Falls, Iowa, assignors to Deere Manufacturing Co., Dubuque, Iowa, a corporation of Iowa Application August 8, 1955, Serial No. 526,971

13 Claims. (Cl. 74—337.5)

This invention relates to a vehicle transmission and control therefor and more particularly to a transmission of the multi-range, multi-speed type in which the number of speeds in the transmission is multiplied by the doubling of speed ratios through the use of dual-range means.

A transmission of this general character has many advantages, not only from the standpoint of reduction in the number of gears but also in the way of flexibility and particularly in the adaptation thereof to an agricultural tractor, for example, in which it is desirable to have a transmission that will produce a large number of ground speeds that vary in relatively small increments. At the same time, it is desirable to have a transmission that will produce a relatively high transport speed for operation of the tractor on highways and other good roads. Moreover, a transmission of the class referred to is capable of producing a large number of speeds in reverse.

A transmission having the general attributes discussed above forms the subject of the U. S. 2,710,546 to DuShane and Rugen. In that transmission, dual-range means is provided for driving a countershaft from an input shaft at either high or low ranges in a forward direction and at least a single range in reverse. Moreover, second means is provided in the transmission for driving an output shaft at any one of four speeds from the countershaft. Actually, the transmission is capable of producing eight speeds forward and four speeds in reverse; although, in the commercial adaptation thereof the highest reverse speed is rendered inoperative, because it would be too high for practical use.

The present invention has as one of its more significant objects the provision of control means for shifting the gears or clutches in a transmission of the type just referred to. Specifically, it is an object of the invention to utilize improved cam means having cam tracks therein for shifting the several clutches used in the transmission. Another significant feature of the invention resides in selector means for controlling the cams. It is preferred, and the present invention so provides, that two dual-purpose cams be used and that each be connected to a single selector. The selectors are arranged for independent movement but are controlled by interlocking means so that they must be operated in a certain sequence.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Fig. 3 is a sectional view as seen along the line 3—3 of Fig. 1.

Fig. 4 is a sectional view as seen along the line 4—4 of Fig. 1.

Fig. 5 is a view of the range-reverse cam as seen along the line 5—5 of Fig. 3.

Fig. 6 is a view of the speed cam as seen along the line 6—6 of Fig. 4.

Figs. 7, 8 and 9 are individual views showing different positions of the range-reverse cam.

Fig. 15 is a sectional view as seen along the line 15—15 of Fig. 1.

In general

Figure 2:
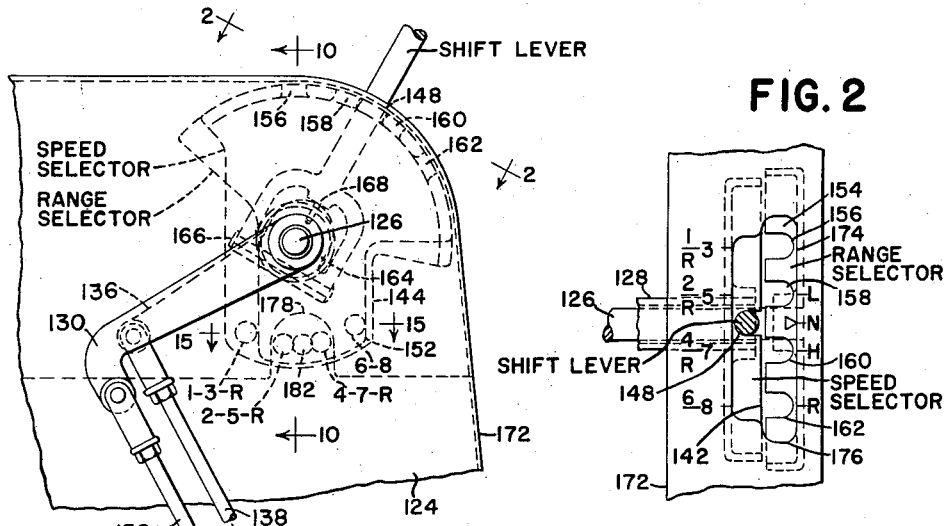
Fig. 2 is a fragmentary view as seen in the direction of the arrows on the line 2—2 of Fig. 1.
Figure 1:
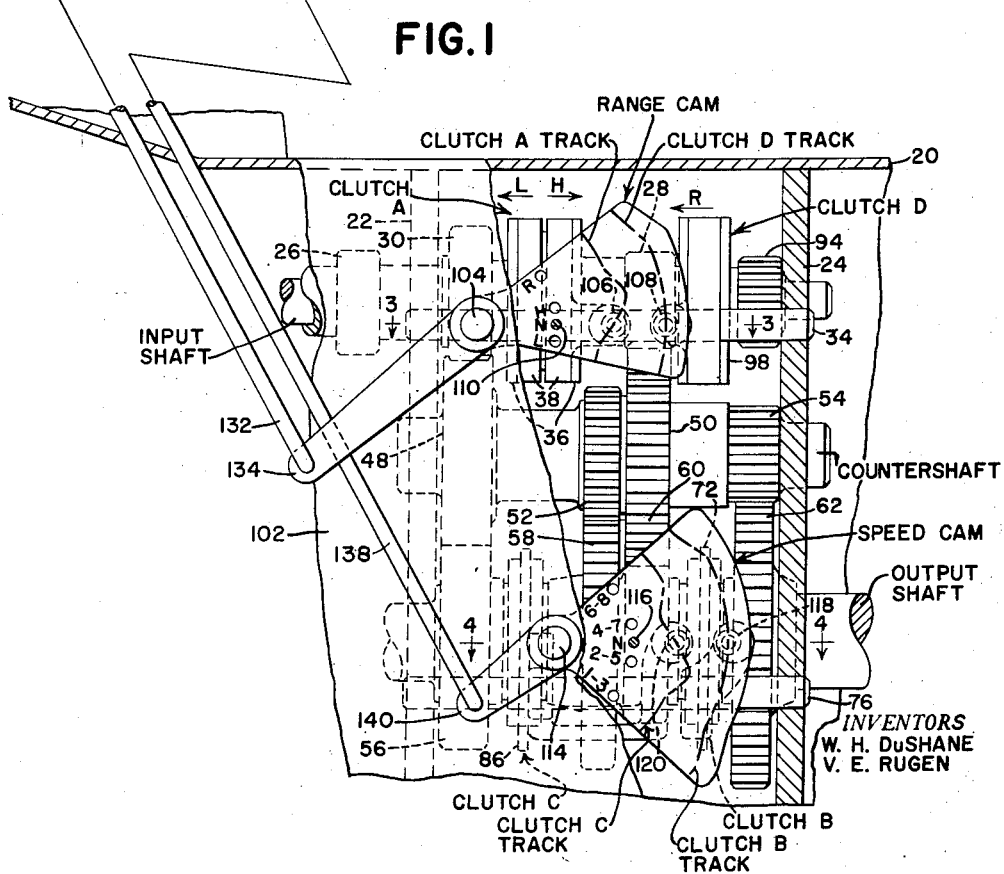
Fig. 1 is a fragmentary elevational view, partly in section, illustrating a transmission and control mechanism associated therewith.
Figure 10:
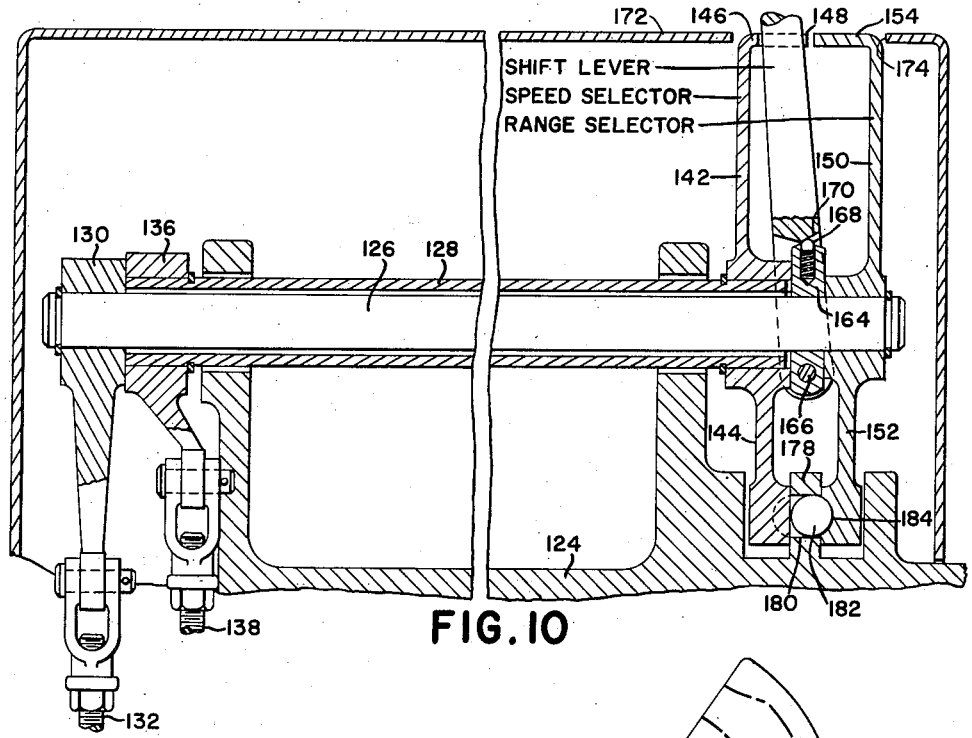
Fig. 10 is a fragmentary sectional view, on an enlarged scale, as seen along the line 10—10 of Fig. 1.

In the interests of simplicity and brevity, many of the parts herein will be designated by conventional nomenclature and this system will be carried over into the claims. It should be understood, of course, that this characteristic of the description is not to be considered as importing any limitations into the range of equivalents to which the invention is entitled. The use of expressions such as "right hand" and "left hand" is based upon the position of an observer standing behind the vehicle and looking forwardly. Figures 1 and 2 are basic views in this respect. The front of the tractor is beyond the left hand margin of the sheet containing Figs. 1 and 2. In Fig. 10, for example, the right and left hand sides of the tractor are respectively at the right and left of the viewer, which corresponds to the position of the tractor operator. The only departure from this system is represented by Figures 5 and 6.

Transmission

The transmission is incorporated as a suitable part of a vehicle which itself may be largely conventional. That portion of the vehicle serving as a transmission housing is designated by the numeral 20 and this housing has appropriate front and rear walls 22 and 24, respectively, between which are appropriate journaled an input shaft, a countershaft and an output shaft. These are appropriately labeled on the drawings and therefore require no separate numerical designation. A pinion 26 is keyed to a front part of the input shaft and serves only to drive a power take-off shaft (not shown) for the vehicle. This pinion plays no important part in the description to follow.

The input shaft has journaled thereon in axially spaced relationship a low-range pinion 28 and a high-range pinion 30. These pinions are individually and selectively connectible to rotate with the input shaft by means of a bi-directionally movable clutch A, which clutch is movable between a neutral position, a low-range position and a high-range position. The direction of movement for connecting the low-range gear 28 to the input shaft is indicated in Figs. 1 and 3 by an arrow L. The direction of movement for effecting high-range operation is indicated by an arrow H. The clutch A may be of any suitable construction adapted for the purposes and is shown here as comprising a sleeve 32 linearly shiftable along a shifter rod 34 that parallels the input shaft. This rod is appropriately carried at opposite ends in the transmission housing walls 22 and 24 (Fig. 1). The sleeve has rigidly secured thereto a pair of fork arms 36 which embrace a pair of synchronizer rings 38. A synchronizer member 40 is splined to a hub 42 which in turn is splined to the input shaft. One of the rings 38 has a splined connection 44 with the high-range pinion 30 and the other ring 38 has a splined connection 46 with the low-range pinion 28. When the clutch A is shifted in the direction L, the rear fork 36 first causes synchronization between the rear ring 38 and the synchronizer member 40, after which the splined connection at 46 is carried over to the splined hub 42, thus connecting the hub 42, low-range pinion 28 and rear synchronizer ring 38 for rotation in unison. This positively connects the low-range pinion 28 to the input shaft. Shifting of the clutch A in the opposite direction (direction H) first synchronizes the front ring 38 and the synchronizer member 40, followed by positive engagement between the high-range pinion 30 and input shaft hub 42 by means of carrying over the splined connection at 44 to the hub as the front fork 36 carries the clutch to the rear.

The clutch A thus enables the input shaft to drive the countershaft at either a high-range or a low-range, since the high-range pinion 30 is in constant mesh with a countershaft gear 48 and the low-range pinion 28 is in constant mesh with a second counter shaft gear 50. Because of the range-effecting characteristic of the clutch A, it will hereinafter be sometimes referred to as a range clutch. As already indicated, the use of the expression "clutch" is not intended to exclude equivalent mechanisms.

The countershaft gears 48 and 50 are preferably formed integral with or otherwise fixed to the counter shaft for rotation therewith. The same is true of third and fourth countershaft gears 52 and 54. The output shaft has journaled thereon in coaxially spaced apart relationship first, second, third and fourth output shaft gears 56, 58, 60 and 62; and these gears are respectively in constant mesh with the countershaft gears 48, 52, 50 and 54.

From the description thus far, it will be seen that drive means is provided for driving the counter shaft in either of two ranges from the input shaft, depending upon the position of the range clutch A. In the drawings, the range clutch is shown in its neutral position but it will be seen that it can be selectively shifted to either a low-range position or a high-range position. The drive means established by the gears 48—56, 52—58, 50—60 and 54—62 serves as means, in conjunction with a pair of speed clutches B and C, for driving the output shaft at any one of four speeds. Because of the dual-range drive to the countershaft, the four speeds just referred to are doubled, thus giving the transmission eight speeds forward.

As best shown in Fig. 4, the clutch B comprises a hub 64 keyed to and axially non-shiftable with respect to the output shaft and externally splined to axially shiftably carry a clutch ring 66. The output shaft gears 60 and 62 respectively have externally splined hub portions 68 and 70, either of which is selectively engaged by the ring 66 when shifted. The drawing shows the clutch ring in its neutral position. Control of the clutch B is accomplished by means of a shifter fork 72 integral with a sleeve 74 that is linearly slidable along a shifter rod 76 parallel to the output shaft and appropriately carried at its front and rear ends by the transmission walls 22 and 24.

The construction of the clutch C is similar to that of the clutch B. Clutch C has a hub 78 fixed to the output shaft and externally splined to axially shiftably carry a clutch ring 80 which is selectively shiftable axially into engagement with one or the other of hubs 82 and 84 respectively formed as part of the output shaft gears 56 and 58. If it be considered that clutch B has a neutral position from which it is shiftable to first and second speed positions, then it will be seen that clutch C has a neutral position from which it is shiftable to third and fourth speed positions. The clutch C is under control of a shifter fork 86 integral with a sleeve 88 that is linearly slidable on the shifter rod 76. In other words, the same shifter rod 76 carries both shifter sleeves 74 and 88.

The respective pitch diameters of the low-range pinion 28 to the countershaft gear 50, the high-range pinion 30 to the countershaft gear 48 and the countershaft gears 48, 52, 50 and 54 respectively to the output shaft gears 56, 58, 60 and 62 are such as to give, in low-range, the following speeds forward: first, second, fourth and sixth; and in high-range, the following speeds forward: third, fifth, seventh and eighth. For example, with the clutch A establishing low-range drive from 28 to 50, clutch B when shifted to the right as seen in Fig. 1, will establish drive from 54 to 62 to the output shaft and will produce first speed. Under the same conditions of the low-range position of clutch A, shifting of clutch B to the left in Fig. 1 will produce sixth speed forward. Clutch C when shifted to the right will produce second speed forward and when shifted to the left will produce fourth speed forward, assuming that clutch A is in its low-range position. When clutch A is shifted in the opposite direction (to the right) to establish drive from the high-range gear 30 to the countershaft gear 48, clutch B when shifted to the right will produce third speed and when shifted to the left will produce eighth. Clutch C when shifted to the right will produce fifth speed and when shifted to the left will produce seventh.

The transmission is capable of producing four speeds in reverse; although, as already indicated, the fourth of these speeds would be too high for practical usage and is therefore blocked out. The reverse speeds are accomplished by the use of a fourth clutch, here identified as the reverse clutch D. As best seen in Fig. 3, the input shaft has keyed thereto a hub 90 on which is axially shiftably keyed a synchronizer member 92. A reverse pinion 94 is journaled on the input shaft and is externally splined to axially shiftably carry a synchronizer ring 96 under control of a shifter fork 98. The fork is connected to a sleeve 100 slidable on the upper or range shift rod 34. When the clutch D is shifted to the left or in the direction R as seen in Fig. 3, the ring 96 remains in engagement with the reverse gear 94 but slides over onto the splines of the input shaft hub 90, synchronization being first effected between the ring 96 and the synchronizer member 92. Under these conditions, the clutch A will be in its neutral position.

The countershaft in Fig. 1 is shown somewhat displaced from its true position, which liberty has been taken in the interests of clarity. The actual position of the countershaft is such that the output shaft gear 62 is in constant mesh with the reverse pinion 94. Therefore, the reverse pinion 94 directly drives the output shaft gear 32 without the interposition of the countershaft; although, since the countershaft gears are in constant mesh with the output shaft gears, the countershaft will rotate idly when clutch D is engaged and clutch A is disengaged. Because the gear 62 is journaled on the output shaft, engagement of clutch D alone does not establish reverse drive. In addition, the clutches B or C must be used. One speed in reverse may be achieved by shifting clutch B to the right so as to engage the output shaft gear 62. The speed ratio will be that between the reverse pinion 94 and the output shaft gear 62. Another reverse speed may be achieved by shifting the clutch B to the left, to connect the output shaft gear 60 to the output shaft. The speed ratio is then that resulting from constant mesh between 94 and 62 and between 62 and 54, since 62, when driven by the reverse pinion 94, always drives the countershaft through the countershaft gear 54. Two other reverse speeds are available by selective shifting of the clutch C.

Cam shifting means

Clutches A and D are under control of means for shifting these clutches independently and so arranged that when one clutch is engaged the other clutch must be disengaged. Since both the high and low forward ranges and the single reverse range may be considered of the same generic character, the range means will be conveniently referred to herein as a range cam. This cam is so labeled in the drawings and will not be numerically identified. As best shown in Fig. 3, the transmission housing 20 has a left hand side wall 102 which journals a short rockshaft 104 on an axis normal to the axis of the shifter rod 34. The portion of the rockshaft internally of the wall 102 is keyed to the hub of the range cam and the range cam projects rearwardly in a radial direction as respects the rockshaft. The plane of the face of the range cam is vertical and the shifter sleeve 32 for the clutch A has a horizontally outwardly projecting pin or follower 106 which is slidably received in and guided by a cam track identified and labeled as the clutch A track. The shifter sleeve 100 for clutch D has a horizontally outwardly projecting pin or follower 108 which is received in a clutch D track in the range cam. The neutral position of the range cam is releasably retained by a detent 110 which is selectively cooperative with a "neutral" notch N. The range cam further has in its outer face, on an arc on which the notch N lies, other notches R, H and L, respectively for reverse, high-range and low-range.

The clutch A and clutch D tracks are clearly shown in Fig. 5, in connection with which it should be remembered that this view shows the range cam from its opposite side as distinguished from the illustration of the range cam in Figs. 1 and 7 through 9. In the latter group of figures, the center line of the track has been shown by a dot-dash line. Fig. 5 shows that each track is in the form of a groove. The clutch A track has a neutral track portion N, which is concentric as respects the axis of the cam rockshaft 104; in addition, the clutch A track has high and low portions H and L offset eccentrically in opposite directions, and these high and low portions are separated by or merge at an intervening neutral portion 112. The relationship of the high, low and neutral portions is such that rocking of the cam causes shifting of the clutch A among its neutral, high and low positions. For example, the neutral position of the range cam is shown in Figs. 1 and 5, as well as in Fig. 3, wherein it will be noted that the detent 110 releasably fixes the neutral position of the cam. If the cam is rocked upwardly (Fig. 9) the detent 110 is released from the neutral notch and enters the low or "L" notch. The offset of the track portion L toward the rockshaft 104 causes shifting of clutch A in a forward direction (arrow L in Fig. 3). In other words, the follower 106 is caused to depart to the left of its neutral position and of course carries the clutch A in the direction necessary to engage clutch A for effecting low-range drive between the input shaft pinion 28 and the input shaft. If the range cam is rocked from the neutral position of Fig. 1 in a clockwise direction to the position of Fig. 8, the follower 106 is displaced by the high track portion and the detent 110 engages in the H notch. Clutch A is then shifted in the opposite direction to establish high-range drive.

It is a feature of the range cam that it serves also to control the reverse clutch D. Accordingly, the clutch D track has a neutral portion N of substantial angular extent. This N portion in the clutch D track is substantially angularly coextensive with the portion of the clutch A track that includes the high and low portions and the portion 112. The reason for this is that clutch D must not be shifted while clutch A is being engaged and disengaged. The effective portion of the clutch D track, which operates to move clutch D in the direction R (Fig. 3) is an offset active portion R which is angularly coextensive with the neutral portion N of the clutch A track. In other words, when the angular movement of the range cam is such that the reverse follower 108 reaches the junction of the N and R portions, so as to be displaced by the eccentrically offset active portion R, the clutch A follower 106 then rides in the neutral portion N of the clutch A track. Again, the arrangement is such that the clutches may be shifted individually but not simultaneously. Fig. 7 shows the position of the range cam when it has shifted the clutch D to its engaged position to establish reverse drive. The follower 106 for the clutch A remains in neutral. Figs. 8 and 9 show that the follower 108 for the clutch D remains in neutral during the engagement and disengagement of the clutch A as the clutch A follower 106 follows the active portions of the clutch A track. The relative position of the cam with respect to the range obtained can be seen by noting the locations of the R, H, N and L detent notches in the cam. These notches have been shown in radial alinement with their respective track portions.

The foregoing principles have been applied to means for effecting individual shifting of clutches B and C. The principal component in this arrangement is a speed cam, labeled as such and requiring no numerical designation. This cam is carried by a rockshaft 114 which is journaled in the transmission side wall 102 and it has a plurality of angularly spaced notches for cooperation with a detent 116. The central notch of the group of notches is a neutral or "N" notch and is shown as engaged by the detent in Figs. 1 and 4, because the speed cam is in its neutral position. Hence, both clutches B and C are in their neutral or disengaged positions. The speed cam has a clutch B track and a clutch C track which respectively receive followers 118 and 120, these followers being respectively connected to the sleeves 74 and 88 for the clutch B and clutch C shifters.

Figures 11, 12, 13, 14:
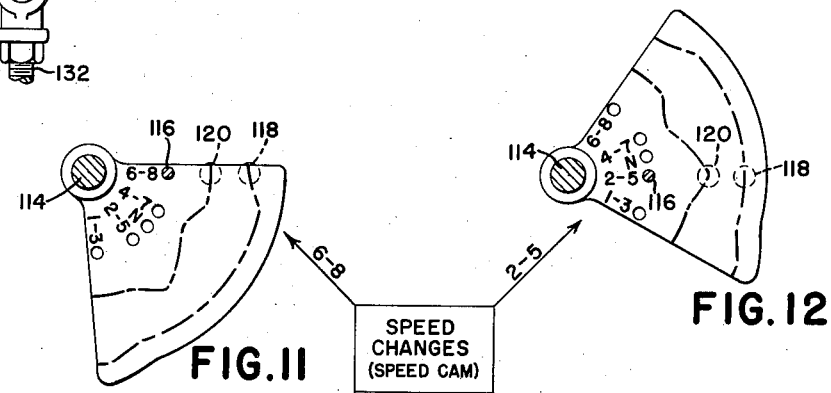
Figs. 11, 12, 13 and 14 are individual views showing different positions of the speed cam.

The clutch B track is effective to accomplish first, third, sixth and eighth speeds, it being remembered that first and sixth are in the low-range and third and eighth are in the high-range. Accordingly, the clutch B track has an intermediate neutral portion N of appreciable angular length. The track is offset at one end to provide an active portion designated 6—8. The opposite end of the track is offset eccentrically in the opposite direction and has an active portion designated 1—3. As the cam is rocked about its axis at 114 and passes through the N range, the follower 118 remains stationary. However, additional angular movement will cause the follower to be displace by either the 6—8 track portion or the 1—3 track portion, depending upon the direction of angular movement. Among the group of detent-receiving notches, of which the neutral notch N is one, there are a 6—8 notch and a 1—3 notch, respectively alined radially with the 6—8 and 1—3 track portions. This will be clear from Figs. 11 and 14. Fig. 11 shows the cam in its 6—8 position and Fig. 14 shows the cam in its 1—3 position. The position of the detent 116 in its respective notch will serve as a designation of the position of the cam. The clutch B track has been shown in dot-dash lines in Figs. 1 and 11 through 14.

The clutch C track is operative to control clutch C for effecting second, fifth, fourth and seventh speeds. Accordingly, this track has a pair of neutral portions N angularly coextensive and radially alined with the 1—3 and 6—8 portions of clutch C track. In addition, clutch C track has offset portions 4—7 and 2—5, these portions being within the angular range of the neutral portion N of the clutch B track. Again, the principal of the cam design is such that only one or the other of clutches B and C may be shifted, but not both simultaneously. Detent-receiving notches 2—5 and 4—7 are included in the aforesaid group of notches and are radially alined respectively with the track portions 2—5 and 4—7. Intermediate the 2—5 and 4—7 track portions is a neutral portion or dwell 122, which portion is radially alined with the neutral detent-receiving notch N for the detent 116. When the cam is in this position (Figs. 1 and 6) both clutches B and C are disengaged. Fig. 12 shows the position of the follower 120 when the speed cam is in a position to engage clutch C for accomplishing second or fifth speed. Fig. 13 shows the 4—7 position of the speed cam. In connection with the positions of the speed cam as shown in Figs. 1 and 11 through 14, it should be remembered that any one of these positions is also effective to control the appropriate clutch (B or C) to obtain reverse, if the clutch A is in neutral and the clutch D is engaged. As indicated above, the foregoing is subject to the limitation that the fourth speed in reverse is not used as a practical matter.

In Figs. 1 and 11 through 14, as in Figs. 1 and 7 through 9, the associated track portions can be determined from the positions of the detent notches, which have been appropriately designated according to the speed or neutral position obtained.

*Control means*

The basic components of the control means are best shown in Figs. 2 and 10 and in the upper portion of Fig. 1. Any suitable support, represented here by the numeral 124, journals coaxially intersleeved rockshafts 126 and 128. The interior rockshaft 126 is a range rockshaft and has keyed to the left hand thereof an arm 130 which is connected by a link 132 to an arm 134 that is keyed to the outer end of the range cam rockshaft 104. Hence, rocking of the rockshaft 126 will effect angular movement of the range cam. The external rockshaft 128 has keyed to its left hand end, just inwardly of the arm 130, an arm 136 which is connected by a link 138 to an arm 140 that is keyed to the outer end of the speed cam rockshaft 114. Because the rockshaft 128 controls the speed cam, it will be hereinafter sometimes referred to as a speed selector rockshaft.

The right hand end of the speed selector rockshaft 128 carries a speed selector having an upstanding sector-shaped portion 142 and a depending portion 144. The upper portion 142 terminates in an arcuate flange 146 which faces to the right and has its marginal edge interrupted by a single notch 148. The proximate end of the range selector rockshaft 126 has keyed thereto a range selector having an upper sector-shaped portion 150 and a lower portion 152. The upper portion 150 is substantially coextensive with the upper portion 142 of the speed selector when both selectors are in their neutral positions (Figs. 1, 2 and 10), and the range selector upper portion 150 terminates in an arcuate flange 154 which extends toward the marginal flange 146 on the speed selector. The marginal edges of the flanges are closely proximate, preferably such as to afford only working clearance. The flange 154 on the range selector is interrupted by a plurality of notches, here four, designated respectively by the numerals 156, 158, 160 and 162. Since the speed and range selectors are keyed respectively to the speed and range rockshafts 128 and 126, rocking of the respective selector will effect angular movement of the respective cam through the associated linkage previously described. However, it is desired that the selectors be movable independently and not simultaneously. For this purpose, there is loosely mounted on or journaled by the rockshaft 126 a carrier 164 which is interposed or sandwiched between the hubs of the selectors. This carrier has a pivot 166 normal to the axis of the rockshafts and this pivot mounts the forked lower end of a shift lever. The shift lever, like the two selectors, is labeled in the drawings and needs no numerical designation. The shift lever extends radially from its position on the rockshaft-mounted carrier 164 and when the selectors are in their neutral positions, the shift lever extends through the notch 148, the cross sectional area of the shift lever and the size of the notch 148 being commensurate. Moreover, the portion of the range selector flange 154 intermediate the notches 158 and 160 constitutes a bar or blocking portion so that the shift lever cannot escape from the notch 148 when the selectors are in neutral (Fig. 2). This requires that the shift lever be used first to shift the speed selector until the shift lever is alined with one of the notches 156, 158, 160 or 162 in the range selector. Biasing means 168 operates between the carrier 164 and a cam surface 170 to resiliently urge the shift lever to the left or into the notch 148.

A shroud or panel 172 affords a plate in which is formed an aperture 174 for defining the path of movement of the shift lever. The portions of the plate that define opposite ends of the aperture limit angular movement of the shift lever and as will be seen a rearward edge portion 176 blocks out the fourth speed in reverse. The plate 172 also serves to carry indicia for making readily visible to the operator the respective positions of the shift lever according to the speed selected in the transmission. For example, the left hand marginal edge of the aperture 174 is labeled, as shown, 1–3–R, 2–5–R, 4–7–R and 6–8. The right hand marginal edge of the aperture 174 is labeled L, N, H and R. The letters L, H and R correspond respectively with the notches 158, 160 and 162 and the letter N corresponds with the bar portion that intervenes between the notches 158 and 160. As shown, the flange 154 of the range selector carries an arrow head which is alinable with any one of the letters L, N, H or R.

Another feature of the invention is the interlock means for preventing simultaneous movement of the speed and range selectors and for compelling initial movement of the speed selector before permitting movement of the range selector. The details of the interlocking means are best shown in Figs. 1, 10 and 15. As shown there, the support 124 includes an upstanding member or ear 178 which is apertured at 180 to carry a detent ball 182. The range selector lower portion 152 has therein a single notch 184. The lower portion 144 of the speed selector has four notches therein, labeled respectively from front to rear as 1–3–R, 2–5–R, 4–7–R and 6–8. When both selectors are in neutral, the detent ball 182 is received in part in the notch 184 in the range selector and movement of the ball out of that position is opposed by a speed selector lower portion blocking element intervening between the 2–5–R notch and the 4–7–R notch. In other words, the size of the ball relative to the size of the aperture 180 and depth of the notch 184 is such that the speed selector in its neutral position locks the ball positively in the notch 184 in the range selector. Therefore, the range selector cannot be moved until the speed selector is first moved to one of its speed positions. For example, if the speed selector is first moved to its 2–5–R position, the 2–5–R notch registers with the ball 182. At the same time, the shift lever in the speed selector notch 148 registers with the notch 158 in the range selector. Therefore, the shift lever may be moved to the right and into the notch 158. Thereafter, the shift lever can be moved fore or aft to rock the range selector. As the range selector moves out of its neutral position, it establishes a positive block on the ball 182, because of the unnotched opposite portions of the range selector lower portion 152. Therefore, the arrangement is such that neither of the selectors can inadvertently move out of its set position and there is no danger of improper operation of the transmission.

*Operation*

The operation of the transmission and control therefor may be best understood from a description of a complete cycle of speed and range selection. For present purposes, it is assumed that all of the components are in their respective neutral positions and it is desired to shift the transmission to obtain first speed forward. Ignoring for the present the effects of whether or not the main engine clutch (not shown) is engaged or disengaged, the operator first moves the speed selector forwardly, since the shift lever is engaged with the speed selector notch 148. This will aline the shift lever with the index 1–3–R on the guide plate 172 and at the same time will register the shift lever with the notch 156 in the range selector flange 154. Simultaneously, the 1–3–R notch in the speed selector lower portion will register with the interlock detent ball 182 and will therefore permit movement of the range selector. With the shift lever in the range selector notch 156, the range selector is moved forwardly until the arrow registers with the letter L at the right hand side of the guide aperture 174. The transmission is now operating in first speed, since first speed is in the group of low-range speeds. As previously described, first speed is obtained by moving the speed cam in a counterclockwise direction to displace clutch B follower 118 to the rear (Fig. 14). In other words, forward movement of the shift lever to the 1–3–R position is counterclockwise movement and the forces thus developed are transmitted through the arm 136, link 138 and arm 140 to the speed cam rockshaft 114. As the speed cam proceeds to its Fig. 14 or 1–3–R position, the clutch C track causes the clutch C follower 120 to move to the position of Fig. 12 and then back to neutral, and it remains in neutral as it is guided by the lower concentric portion of clutch C track. The fact of engagement and then disengagement of clutch C is immaterial because the clutches A and B are perforce disengaged.

Likewise, as the range selector is moved forwardly to aline the arrow thereon with the L on the plate 172, the movement is counterclockwise, which is transmitted through the arms 130 and 134 and link 132 to the range cam for moving that cam angularly in a counterclockwise direction. Therefore, the range cam moves from the neutral position of Fig. 1 to the low position of Fig. 9. The reverse clutch D is not disturbed, since its follower 108 follows the neutral or concentric portion of its track.

While the speed selector remains in its 1–3–R position (already selected), the range selector may be moved to its high or reverse position. If it is moved to its high position, it shifts clutch A in the H direction and the transmission now operates in third speed forward, since third speed is the high-range counterpart of low-range first speed. Again, the position of clutch D is not disturbed. One speed in reverse may be obtained by leaving the speed selector in the position already selected and by continuing movement of the range selector in a rearward direction until the arrow registers with the letter R at the right hand side of the guide aperture 174. Clutch A remains in neutral and clutch D is engaged. Since clutch B has been engaged by movement thereof to the rear or to the right, reverse drive is from the reverse pinion 94 to the output gear 62 and directly to the output shaft, since shifting of clutch B to the right or to the rear effects engagement between its clutch ring 66 and the toothed hub 70 on the output gear 62 (see Fig. 4).

Flexibility in obtaining the other speeds follows from the foregoing. In short, the speed selector is first moved to select a group of speeds, which will be determined by the direction of shifting of one or the other of clutches B and C. Hence, each group contains three speeds, with the exception of the 6–8 group, which, as previously described, may be blocked out because of the configuration of the guide aperture at 176. This relationship is as follows: Let it be assumed that the shift lever, in engagement with the notch 148 in the speed selector, is moved rearwardly so that the notch 148 lines up with the 6–8 index. At the same time, the shift lever is in register with the rearwardmost notch 162 in the range selector. Hench, the shift lever may be shifted to the right and into the notch 162. Now, the portion 176 constitutes a limitation on rearward movement of the range selector, because, as will be readily seen, the distance between the notch 162 and the portion 176 corresponds relatively with the distance between the arrow and the index H. Therefore, rearward movement of the range selector is limited to its high position. There is no limit on its forward position, as among low, neutral and high.

Summary

The transmission and control provided therefor is characterized by extreme simplicity and flexibility, considering the eleven speeds (12 speeds available) produced thereby, all under control of a single shift lever and a pair of selectors. The interlock means prevents inadvertent shifting of either selector in those cases in which selector movement may be accomplished by some instrumentality other than the shift lever. The tracks in the respective cams afford sequential operation in a desirable order, all based upon experience in the sequence of speeds needed in efficient tractor operation. These can, of course, be varied to suit individual desires. Other features of the invention not categorically enumerated hereing will undoubtedly occur to those versed in the art, as will many modifications and alterations in the structure disclosed, all of which may be achieved without departing from the spirit and scope of the invention as defined in the appended claims.

What is claimed is:

1. A transmission and control therefor, comprising: input, output and countershafts; multi-range drive means for driving the countershaft from the input shaft and including a range clutch shiftable among neutral and first and second active positions; multi-speed drive means for driving the output shaft from the countershaft and including a speed clutch shiftable among neutral and first and second active positions; a speed selector movable among neutral and first and second active positions for achieving corresponding positions of the speed clutch and having a laterally opening shifter-receiving notch; a shifter alongside and movable relative to said selector both laterally of and parallel to said selector and normally received in said notch; and a range selector movable parallel and relative to the speed selector among neutral and first and second active positions for achieving corresponding positions of the range clutch, said range selector having a bar portion opposed to the speed selector notch when both selectors are in neutral so as to confine the shifter to the speed selector notch, said range selector having additional notches angularly offset from said bar portion so that after the speed selector is moved by the shifter to either active position independently of the range selector said shifter may be moved laterally into one of said range selector notches whereby said shifter may move said range selector to either of its active positions independently of the speed selector.

2. The invention defined in claim 1, including: releasable locking means cooperative between the selectors for preventing movement of the range selector until the speed selector has been moved to either of its active positions.

3. A transmission and control therefor, comprising: input, output and countershafts; multi-range drive means for driving the countershaft from the input shaft and including a range clutch shiftable among neutral, high-range and low-range positions and a reverse clutch shiftable between neutral and reverse positions; multi-speed drive means for driving the output shaft from the countershaft and including a speed clutch shiftable among neutral and first and second active positions; a speed selector movable among neutral and first and second active positions for achieving corresponding positions of the speed clutch and having a laterally opening shifter-receiving notch; a shifter alongside and movable relative to said selector both laterally of and parallel to said selector and normally received in said notch; and a range selector movable parallel and relative to the speed selector among neutral, high-range, low-range and reverse positions for achieving corresponding positions of the range clutch, said range selector having a bar portion opposed to the speed selector notch when both selectors are in neutral so as to confine the shifter to the speed selector notch, said range selector having additional notches angularly offset from said bar portion so that after the speed selector is moved by the shifter to either active position independently of the range selector said shifter may be moved laterally into one of said range selector notches whereby said shifter may move said range selector to any of its aforesaid high-range, low-range and reverse positions independently of the speed selector.

4. A transmission, comprising: input, counter and output shafts; and drive means for driving the countershaft forwardly from the input shaft at either a high-range or a low-range or reversely in at least one range, including a range clutch shiftable axially on the input shaft among neutral, high and low positions and a reverse clutch shiftable axially on the input shaft between neutral and reverse positions; a range-reverse cam rockable about an axis and having a range track and a reverse track and range and reverse followers respectively in said tracks and respectively connected to the range and reverse clutches, said range track having a concentric portion defining the neutral position of the range clutch and angularly spaced portions offset eccentrically in opposite directions and respectively defining the high and low positions of the range clutch, said reverse track having a concentric portion defining the neutral position of the reverse clutch and an eccentric portion defining the reverse position of said reverse clutch and the concentric portions of each track being radially alined with the eccentric portions of the other track; multi-speed drive means for driving the output shaft from the countershaft at any one of first, second, third and fourth speeds, including a first-second clutch axially shiftable on the output shaft among neutral, first and second positions and a third-fourth clutch axially shiftable on the output shaft among neutral, third and fourth positions; a speed cam rockable about an axis and having a first-second track, a third-fourth track, and first-second and third-fourth followers respectively in said tracks and respectively connected to the first-second and third-fourth clutches, said first-second track having a concentric portion defining the neutral position of the first-second clutch and angularly spaced first and second portions offset eccentrically in opposite directions and respectively defining the first and second positions of the first-second clutch, said third-fourth track having a concentric portion radially alined with the first-second track portions and defining the neutral position of the third-fourth clutch and third and fourth portions offset eccentrically in opposite directions and radially alined with the neutral portion of the first-second track and respectively defining the third and fourth positions of the third-fourth clutch; selector means for rocking the range-reverse cam; selector means for rocking the speed cam; and interlock means operative to compel individual operation of each selector means.

5. A transmission, comprising: input, counter and output shafts; and drive means for driving the countershaft forwardly from the input shaft at either a high-range or a low-range or reversely in at least one range, including a range clutch shiftable linearly among neutral, high and low positions and a reverse clutch shiftable linearly between neutral and reverse positions; a range-reverse cam movable transversely to the line of movement of the range and reverse clutches having a range track and a reverse track and range and reverse followers respectively in said tracks and respectively connected to the range and reverse clutches, said range track having a neutral portion defining the neutral position of the range clutch and spaced active portions offset in opposite directions from the line of movement of said cam and respectively defining the high and low positions of the range clutch, said reverse track having a neutral portion defining the neutral position of the reverse clutch and an active offset portion defining the reverse position of said reverse clutch, and the neutral portions of each track being alined with the active portions of the other track; multi-speed drive means for driving the output shaft from the countershaft at any one of first, second, third and fourth speeds, including a first-second clutch shiftable linearly among neutral, first and second positions and a third-fourth clutch shiftable linearly among neutral, third and fourth positions; a speed cam movable transversely to the line of movement of the first-second and third-fourth clutches and having a first-second track, a third-fourth track, and first-second and third-fourth followers respectively in said tracks and respectively connected to the first-second and third-fourth clutches, said first-second track having a neutral portion defining the neutral position of the first-second clutch and spaced first and second active portions offset in opposite directions from the line of movement of said cam and respectively defining the first and second positions of the first-second clutch, said third-fourth track having a neutral portion alined with the first-second track portions and defining the neutral position of the third-fourth clutch and third and fourth portions offset in opposite directions from the line of movement of said cam and respectively alined with the neutral portion of the first-second track and respectively defining the third and fourth positions of the third-fourth clutch; selector means for moving the range-reverse cam; selector means for moving the speed cam; and interlock means operative to compel individual operation of each selector means.

6. Control means for a transmission of the character described, comprising: a support; first and second coaxial rockshafts carried by the support for independent rocking; first and second selectors fixed respectively to and extending radially from the rockshafts in side-by-side relationship, each selector having an arcuate flange and said flanges facing toward each other and having their respective marginal edges closely proximate to each other, said first selector flange having a single notch therein opening at its marginal edge and said second selector flange having a plurality of notches therein opening at its marginal edge and angularly offset from the first selector notch when both selectors are neutrally positioned, whereby an unnotched portion of each flange is directly opposite a notch in the other flange; a shifter sandwiched between the selectors and normally received in the first selector notch and confined thereto by the opposing unnotched portion of the second selector flange; and means mounting the shifter for angular and lateral movement relative to the selectors, whereby said first-selector-notch-engaged shifter is effective to move the first selector angularly until said shifter is opposite to and receivable by a second selector notch to be moved laterally out of said first selector notch and into said opposite notch for moving the second selector angularly independently of the first selector.

7. The invention defined in claim 6, including: detent means for releasably locking the selectors in positions respectively corresponding to their notch and notches.

8. Control means for a transmission of the character described, comprising: a support; a first selector rockable on the support; a second selector coaxially rockable on the support independently of the speed selector and closely spaced laterally from said speed selector; a member rigid on the support and projecting into the space between the selectors, said member having an aperture therethrough parallel to the rocking axis of the selectors; a detent in said aperture; the first selector having a single notch therein receiving part of said detent when said notch and detent are in register and the second selector having a blocking portion registrable with the aperture to confine the detent to the aperture and said notch and thereby to lock said first selector against rocking; said second selector having at least one detent notch spaced angularly from said blocking portion and for receiving part of said detent when said second selector is moved angularly, whereby the detent is released from the first selector notch to release said first selector for angular movement; and said first selector having a blocking portion adjoining said first selector notch and engaging and forcing the detent to lock into the second selector notch when said second selector is moved angularly.

9. Control means for a transmission of the character described, comprising: a support; a first selector movable on the supports; a second selector movable on the support parallel to and independently of the speed selector and closely spaced laterally from said speed selector; a member rigid on the support and projecting into the space between the selectors, said member having an aperture therethrough transverse to the planes of movement of the selectors; a detent in said aperture; the first selector having a single notch therein receiving part of said detent when said notch and detent are in register and the second selector having a blocking portion registrable with the aperture to confine the detent to the aperture and said notch and thereby to lock said first selector against movement; said second selector having at least one detent notch spaced from said blocking portion in the direction of selector movement for receiving part of said detent when said second selector is moved, whereby the detent is released from the first selector notch to release said first selector for movement; and said first selector having a blocking portion adjoining said first selector notch and engaging and forcing the detent to lock into the second selector notch when said second selector is moved.

10. Control means for a transmission of the character described, comprising: a support; first and second coaxial rockshafts; first and second closely axially spaced selectors fixed respectively to and projecting radially from the rockshafts for independently rocking said rockshafts; a carrier journaled on one rockshaft between the selectors; a shifter pivoted to the carrier on an axis transverse to the rockshafts and extending radially between the selectors for lateral movement toward and away from said selectors; means on the first selector including a notch for receiving the shifter when the shifter is moved toward said first selector, whereby the shifter and first selector are movable angularly in unison independently of the second selector from a neutral position to a displaced position; and means on the second selector including a notch for receiving the shifter when said shifter is moved laterally in the opposite direction after movement thereof with the first selector to said displaced position, whereby the shifter and second selector may be moved angularly in unison independently of the first selector.

11. The invention defined in claim 10, including means biasing the shifter for lateral movement toward the first selector.

12. The invention defined in claim 10, including: a guide plate over the selectors and having an aperture through which the shifter extends, said plate having angularly spaced portions defining opposite ends of the aperture and limiting angular movement of the shifter.

13. The invention defined in claim 10, including: detent means on the support and cooperative with the selectors, said detent means including a positive lock controlled by the first selector in its neutral position for preventing angular movement of the second selector until the first selector is first moved to its displaced position.

References Cited in the file of this patent
UNITED STATES PATENTS

| | | |
|---|---|---|
| 826,851 | Hendrickson | July 24, 1906 |
| 854,480 | Frayer et al. | May 21, 1907 |
| 1,400,494 | Woodhull | Dec. 13, 1921 |
| 2,031,807 | Werner | Feb. 25, 1936 |
| 2,667,082 | Brock et al. | Jan. 26, 1954 |